(12) United States Patent
De Haas et al.

(10) Patent No.: US 7,884,744 B2
(45) Date of Patent: Feb. 8, 2011

(54) CIRCUIT ARRANGEMENT, L[OCAL] I[NTERCONNECTED] NE[TWORK] COMPRISING SUCH CIRCUIT ARRANGEMENT AS WELL AS METHOD FOR PROCESSING INPUT SIGNALS OF THE LIN

(75) Inventors: Clemens Gerhardus De Haas, Ewijk (NL); Inesz Marycka Weijland, Malden (NL); Gerrit Jan Bollen, Dieren (NL); Edwin Schapendonk, Oss (NL)

(73) Assignee: NXP B.V., Eindhoven (NL)

( * ) Notice: Subject to any disclaimer, the term of this patent is extended or adjusted under 35 U.S.C. 154(b) by 58 days.

(21) Appl. No.: 12/439,191

(22) PCT Filed: Aug. 22, 2007

(86) PCT No.: PCT/IB2007/053349

§ 371 (c)(1),
(2), (4) Date: Feb. 27, 2009

(87) PCT Pub. No.: WO2008/026130

PCT Pub. Date: Mar. 6, 2008

(65) Prior Publication Data

US 2009/0267814 A1   Oct. 29, 2009

(30) Foreign Application Priority Data

Aug. 30, 2006   (EP) ................... 06119824

(51) Int. Cl.
*H03M 1/00* (2006.01)
(52) U.S. Cl. .................. 341/110; 375/243; 341/144; 341/155

(58) Field of Classification Search ................. 341/110, 341/155, 144; 375/243; 380/221
See application file for complete search history.

(56) References Cited

U.S. PATENT DOCUMENTS

| 4,800,574 A | * | 1/1989 | Tanaka et al. ............... 375/243 |
| 6,175,630 B1 | * | 1/2001 | Katznelson ................. 380/221 |
| 2002/0149404 A1 | | 10/2002 | De Haas et al. |
| 2004/0141560 A1 | | 7/2004 | Koyasu |
| 2006/0039504 A1 | | 2/2006 | Sicard |

FOREIGN PATENT DOCUMENTS

| EP | 1898565 A1 | 3/2008 |
| WO | 0207912 A1 | 1/2002 |
| WO | 02/073912 A1 | 9/2002 |
| WO | 2004059930 A1 | 7/2004 |

* cited by examiner

*Primary Examiner*—Jean B Jeanglaude

(57) ABSTRACT

Circuit arrangement, LIN comprising such circuit arrangement as well as method for processing input signals of the LIN In order to further develop a circuit arrangement (100)—for processing at least one input signal (12) from at least one data bus (10) of at least one LIN and—for providing the data bus (10) with at least one output signal (18), as well as a corresponding operating method in such way that EMI performance and/or EMI performance of the LIN (300) is improved, it is proposed to provide—at least one analog-digital converting circuit (ADC) for converting the analog input signal (12) into at least one digital signal (14) to be processed, and—at least one digital-analog converting circuit (DAC) for converting the processed digital signal (16) into the analog output signal (18).

7 Claims, 3 Drawing Sheets

Figure 1:
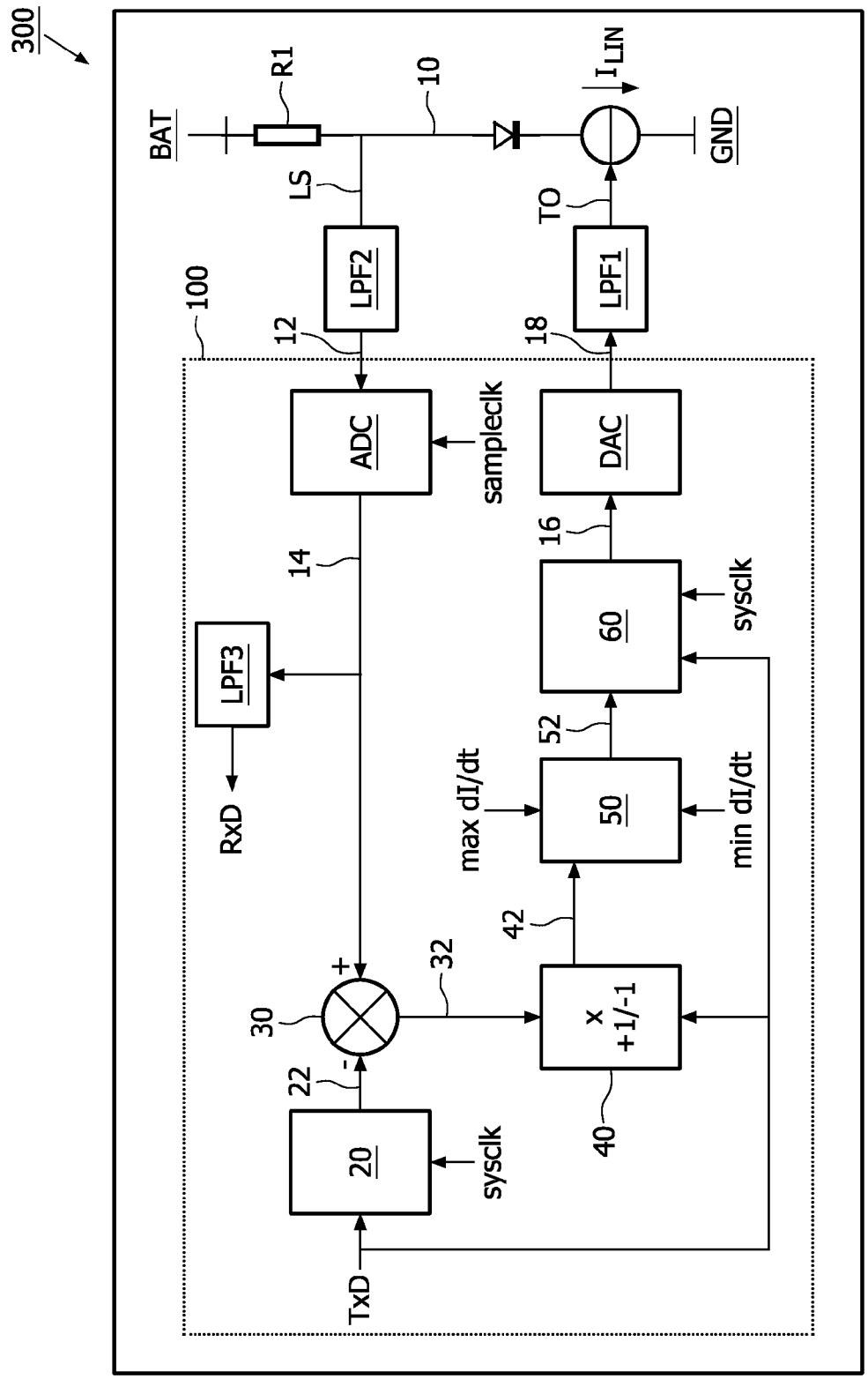

CIRCUIT ARRANGEMENT, L[OCAL] I[NTERCONNECTED] NE[TWORK] COMPRISING SUCH CIRCUIT ARRANGEMENT AS WELL AS METHOD FOR PROCESSING INPUT SIGNALS OF THE LIN

The present invention relates a circuit arrangement
for processing at least one input signal from at least one data bus of at least one L[ocal]I[nterconnected]N[etwork] and
for providing the data bus with at least one output signal.

The present invention further relates to a method according to the preamble of claim 8.

The L[ocal]I[nterconnected]N[etwork] protocol is a serial communication protocol, which efficiently supports the control of mechatronic nodes in distributed automotive applications. The domain is a multiplex bus, a so-called class-A multiplex bus, with a single master node and with a set of slave nodes. This concept of a single master and of multiple slaves is a main property of the data bus of the LIN.

A further main property of the LIN data bus is its low cost silicon implementation
based on common U[niversal]A[synchronous]R[eceiver]T[ransmitter]/S[erial]C[ommunication]I[nterface] hardware, and an equivalent in software, or
as pure state machine.

Beside this, self-synchronization without ceramic resonator or quartz resonator in the slave nodes and guarantee of latency times for signal transmission are further main properties of the LIN data bus.

Moreover, low cost single-wire implementation and speed-up option to twenty kilobits per second are further main properties of the LIN data bus.

The E[lectro]M[agnetic]I[mmunity] performance of a LIN transceiver used in an automotive environment is a very important parameter. R[adio]F[requency] disturbances on the transmitter output stage, for example on the line driver output, can result in unwanted state changes between recessive voltage levels and dominant voltage levels.

Alternatively, RF disturbances on the transmitter output stage can result in an asymmetrical propagation delay from at least one transmitting signal to at least one receiving signal between the rising and falling edges of the LIN bus signals, which results in the receiving signal not having a fifty percent duty cycle; both can be a cause for faulty communication.

The current LIN transmitters are analog, with the current output stage having a superior EMI behavior but showing less E[lectro]M[agnetic]E[mission] performance compared to the voltage output stage. The receiver part is conventionally an analog comparator being connected to the LIN by means of an analog low pass filter.

According to prior art, there are two system choices how to drive the LIN bus without disturbances of RF signals. One possibility is to use at least one voltage feedback output stage for reading the voltage feedback. This means that extra current during RF injection is sinked or sourced by the voltage feedback output stage. However, the output with RF disturbance cannot be presently controlled by the voltage feedback output stage.

Thus, with respect to EMI using at least one current output stage is the better choice for preventing the RF signals from disturbing the LIN bus. Such current output stage allows
the respective RF signal to superimpose on the original LIN signal or to be superimposed on the original LIN signal, and
to filter out RF disturbances by means of at least one low pass filter at the input of the receiver.

However, a disadvantage of the current output stage is that the derived voltage dV/dt of the LIN bus, in particular of the output, can vary with the load. When using a current source to control the voltage on the LIN bus line, not only the current from the current source but also the load impedance on the bus line dictates the LIN bus voltage.

According to the LIN protocol specification, the resistive load on a LIN bus can vary between 500 ohm and 1 kiloohm. Since there is a lower limit on the derived voltage dV/dt, a current output stage will have more emission, i.e. a higher derived voltage dV/dt, when a load of 1 kiloohm is present.

A way to reduce a delay error caused by different loads on the LIN bus is described in prior art document US 2002/0149404 A1. In prior art document US 2006/0039504 A1 a low power LIN receiver is described.

The prior art documents US 2004/0141560 A1 and WO 2004/059930 A1 both describe a way to generate a LIN output signal with low radiation.

However, none of the prior art documents presents a solution in which both advantages of the two system choices, namely the voltage feedback output stage and the current output stage, are combined.

Starting from the disadvantages and shortcomings as described above and taking the prior art as discussed into account, an object of the present invention is to further develop a circuit arrangement of the kind as described in the technical field as well as a method of the kind as described in the technical field in such way that E[lectro]M[agnetic]E[mission] performance and/or E[lectro]M[agnetic]I[mmunity] performance of the L[ocal]I[nterconnected]N[etwork] is improved.

The object of the present invention is achieved by a circuit arrangement comprising the features of claim 1 as well as by a method comprising the features of claim 8.

Advantageous embodiments and expedient improvements of the present invention are disclosed in the respective dependent claims.

The present invention is principally based on the idea of adaptive slope control by providing a digital circuit arrangement, in particular a digital L[ocal]I[nterconnected]N[etwork] transceiver, for example a digital LIN control loop, such as a digital LIN feedback loop.

This digital circuit arrangement is advantageously designed for determining the slope of the input signal, in particular for measuring the actual slope of the LIN signal, and for using this information to control the slope of the output signal.

According to a preferred embodiment of the present invention the data bus of the L[ocal]I[nterconnected]N[etwork] is provided with at least one current source, being driven by the output signal of at least one digital-analog converting means. This digital-analog converting means is preferably connected to the data bus via at least one first analog low pass filter.

The receiving part of the circuit arrangement advantageously comprises at least one digital comparing means, in particular at least one adder and/or at least one multiplexer, being connected to the data bus by means of at least one further analog low pass filter, for example by means of at least one anti-aliasing filter.

For sampling the input signal through the further analog low pass filter, the analog-digital converting means can be provided with at least one first time signal, for example with at least one predetermined sample clock signal.

The comparing means is preferably designed for determining at least one error of the input signal. For this reason, the comparing means can be provided with at least one digital signal from the analog-digital converting means and with at least one reference signal, in particular with at least one wanted signal, from at least one reference means, in particular from at least one wave generator. Thus, the sampled input signal, in particular the sampled signal from the data bus of the LIN, can be compared to the reference signal.

Depending on at least one transmitting signal, which is preferably provided to the comparing means and/or to at least one inverting means and/or to at least one controlling means, the determined error can be inverted.

The optionally inverted error signal is preferably supplied to at least one limiting means being advantageously designed for reducing the control of the circuit arrangement such that it is enough to keep the voltage dV/dt of the data bus of the LIN constant with a load variation for example between 500 ohm and 1 kiloohm.

For this reason, the limiting means can be provided
  with at least one minimum (=min dI/dt) of the current dI/dt derived from the LIN, in particular from the data bus of the LIN, as well as
  with at least one maximum (=max dI/dt) of the current dI/dt derived from the LIN, in particular from the data bus of the LIN.

The limiting signal, i.e. the limited and optionally inverted error signal, can be supplied to the controlling means, in particular to at least one counter, and can for example be added to at least one value, in particular to at least one counter value, or can be subtracted from this value, in particular from this counter value. This value may be created from the transmitting signal and from at least one further time signal, in particular from at least one further system clock signal.

The controlling means advantageously provides the digital-analog converting means with the processed digital signal, which can be used to drive the output signal of the digital-analog converting means.

Thus, according to a preferred embodiment of the present invention, the circuit arrangement comprises at least one voltage feedback in the digital domain being designed for correcting the current dI/dt derived from the LIN, in particular for correcting the variation dI/dt of the output current, which output current is supplied to the data bus of the LIN.

This means, that according to an advantageous embodiment of the present invention the state of the signal of the data bus 10, in particular of the LIN signal, is not directly influenced by the feedback. The transition between the recessive state and the dominant state (and vice versa) of the signals of the circuit arrangement is preferably not interrupted but always happens.

The combination of controlling the derived LIN signal current $dI_{LIN}/dt$ of the LIN, in particular of the data bus or data line of the LIN, instead of controlling the current $I_{LIN}$ of the LIN and a hard accurate limit on the derived LIN signal current $dI_{LIN}/dt$ gives the advantage that the LIN, in particular the feedback of the circuit arrangement, can operate under R[adio]F[requency] disturbance.

The original advantage of a constant derived voltage dV/dt is still present, so this preferred embodiment of the present invention has a good E[lectro]M[agnetic]E[mission] performance as well as a good E[lectro]M[agnetic]I[mmunity] performance.

Another advantage is that the input signal is already sampled, and by using at least one digital low pass filter at least one receiving signal can easily be created. The digital low pass filter can for example be a so-called brick wall filter improving the E[lectro]M[agnetic]I[mmunity] of the receiving part of the circuit arrangement.

This digital receiver, in particular comprising the digital low pass filter and the comparing means, can be much smaller in terms of chip area compared to a conventional analog filter and comparator. The same goes for the transmitter part of the circuit arrangement of the present invention, with the major part being digital and thus being capable of being made very small in chip area when for example a deep sub-micron process is used.

The present invention further relates to a L[ocal]I[nterconnected]N[etwork] comprising a number of nodes being interconnected by means of at least one data bus, wherein at least part of the nodes comprise at least one circuit arrangement as described above.

According to a particularly inventive refinement of the present invention, the circuit arrangement of the LIN is at least one digital transceiver being
  assigned to at least one automobile distributed communication system and/or
  integrated with at least one digital feedback control block for improving
    the E[lectro]M[agnetic]E[mission] performance and/or
    the E[lectro]M[agnetic]I[mmunity] performance.

Finally, the present invention relates to the use of at least one circuit arrangement as described above and/or of at least one L[ocal]I[nterconnected]N[etwork] as described above and/or of the method as described above for improving
  the E[lectro]M[agnetic]E[mission] performance and/or
  the E[lectro]M[agnetic]I[mmunity] performance of the L[ocal]I[nterconnected]N[etwork].

In particular, the present invention is applicable in at least one product comprising LIN support; for example, the present invention can be used in several LIN slave products, such as in at least one LIN slave used in at least one automotive system, for instance in at least one so-called automotive in-vehicle networking system.

The present invention can further be used in a new process called ABCD9. This is a high voltage, in particular about 100 Volt, CMOS process with deep sub-micro feature sizes, for example with sizes about 120 nanometer. The digital circuit arrangement, i.e. the digital part of the CMOS, can be very small compared to the analog part of the CMOS circuitry.

Figure 2A:
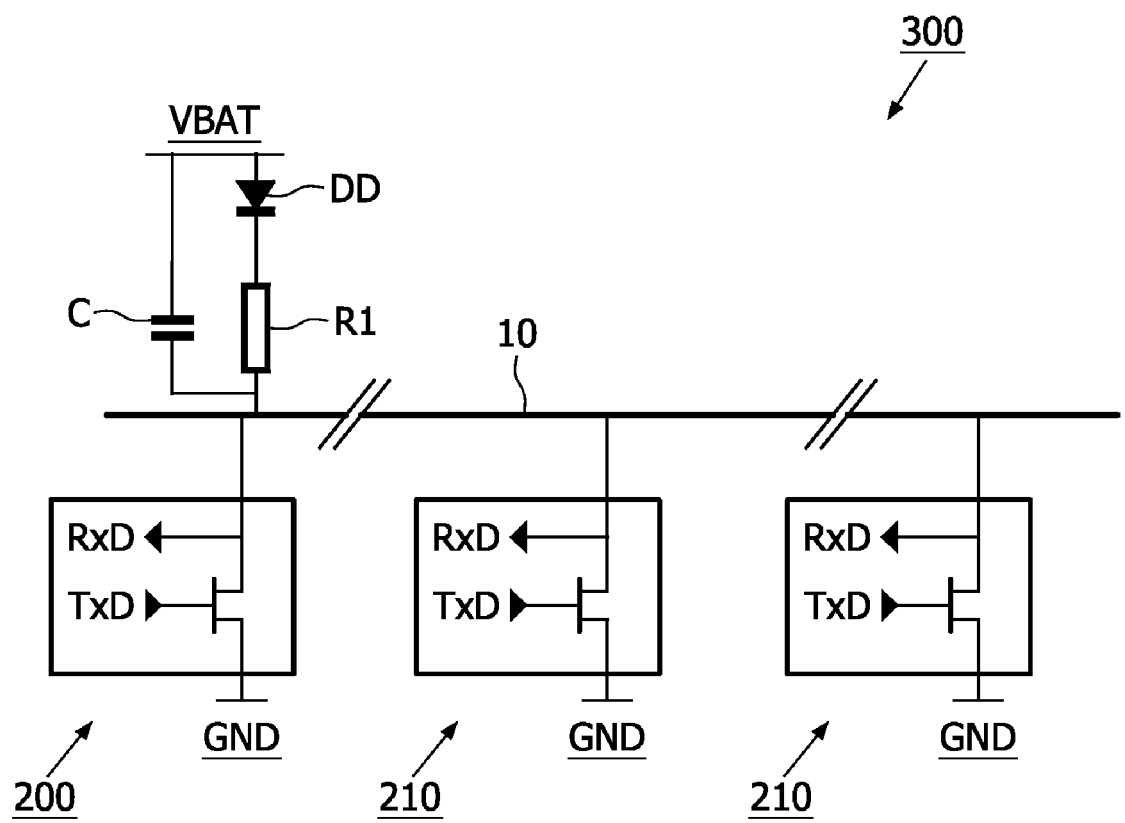
Figure 2B:
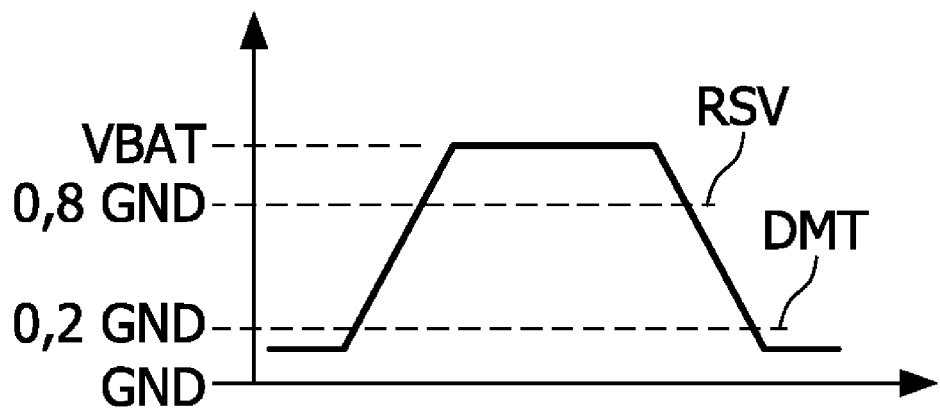
Figure 2C:
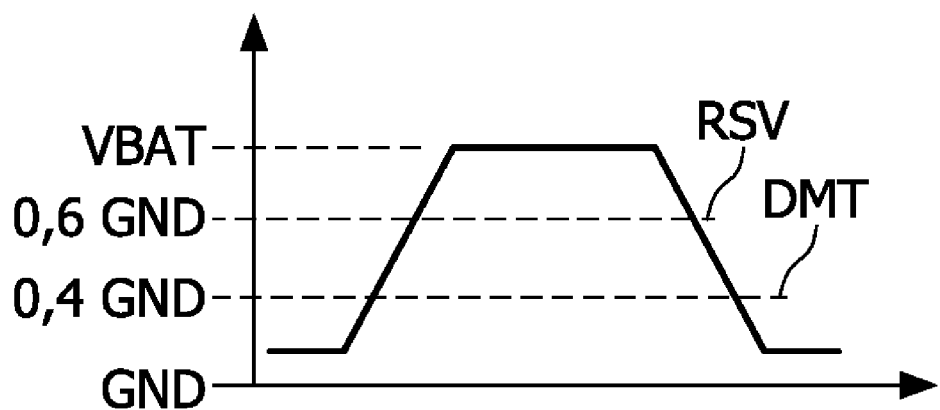

As already discussed above, there are several options to embody as well as to improve the teaching of the present invention in an advantageous manner. To this aim, reference is made to the claims respectively dependent on claim 1, on claim 6 and on claim 8; further improvements, features and advantages of the present invention are explained below in more detail with reference to a preferred embodiment by way of example and to the accompanying drawings where FIG. 1 schematically shows an embodiment of the L[ocal]I[nterconnected]N[etwork] according to the present invention comprising an embodiment of the circuit arrangement according to the present invention and being operated according to the method of the present invention;

FIG. 2A schematically shows an overview of the L[ocal]I[nterconnected]N[etwork] of FIG. 1;

FIG. 2B schematically shows signals occuring in the data bus of the L[ocal]I[nterconnected]N[etwork] of a driver node; and FIG. 2C schematically shows signals occuring in the data bus of the L[ocal]I[nterconnected]N[etwork] of a reveiver node.

The same reference numerals are used for corresponding parts in FIG. 1 to FIG. 2C.

The block diagram of an embodiment of a digital circuit arrangement 100 enabling adaptive slope control according to the present invention is shown in FIG. 1.

The digital circuit arrangement 100 is designed for processing an analog input signal 12 from a data bus 10 of a L[ocal]I[nterconnected]N[etwork] 300 and for providing the data bus 10 with an analog output signal 18.

The data bus 10 of the LIN is connected with a power supply unit BAT, namely with a battery, and with ground GND. The current $I_{LIN}$ of the data bus 10 is flowing from the battery BAT through an external pull up resistor R1. With no current the LIN signal LS is equal to the BAT, which is called recessive, and at its maximum current the LIN signal LS will become about 0.65 Volt, which is called dominant.

The LIN signal LS is supplied to an analog low pass filter LPF2, namely to an anti-aliasing filter, being connected with the data bus 10 of the LIN 300. The anti-aliasing filter LPF2 creates the input signal 12 and provides an A[nalog]D[igital]C[onverter] of the digital circuit arrangement 100 with this input signal 12.

The analog-digital converting means ADC being further provided with a first time signal sampleclk, namely with a predetermined sample clock signal, samples the LIN signal LS through the anti-aliasing filter LPF2 and converts the analog input signal 12 into a digital signal 14 to be processed.

Within the digital circuit arrangement 100 the analog-digital converting means ADC is connected
- with a digital low pass filter LPF3 for creating a receiving signal RxD, and
- with a comparing means 30, for example with an adder and/or with a multiplexer.

The comparing means 30 is designed for determining an error of the input signal 12 by comparing the digital signal 14 with a reference signal 22, in particular by determining the deviation or difference between the digital signal 14 and the reference signal 22.

The reference signal 22 is provided by a reference means 20, namely by a wave generator, wherein the wave generator 20 is provided
- with a transmitting signal TxD, and
- with a further time signal sysclk, namely with a predetermined system clock signal.

The system clock signal sysclk determines the dominant pole in the circuit arrangement 100, in particular in the closed loop, and is chosen such that the system of the LIN 300, in particular of the circuit arrangement 100, is stable; this means that the sample clock signal sampleclk needs to be higher than the system clock signal sysclk.

The comparing means 30 is connected with an inverting means 40 and provides the inverting means 40 with an error signal 32. For inverting the error signal 32 in dependence on the transmitting signal TxD, the inverting means 40 is further provided with the transmitting signal TxD.

The optionally inverted error signal 42 is transmitted from the inverting means 40 to a limiting means 50.

For determining a limiting signal 52 the limiting means 50 is further provided
- with a minimum min dI/dt of the current dI/dt derived from the LIN 300, and
- with a maximum max dI/dt of the current dI/dt derived from the LIN 300.

The minimum current min dI/dt is preferably chosen such that with a load of 1 kiloohm this will give the desired derived voltage dV/dt on the LIN data bus 10, in particular on the LIN pin. The maximum current max dI/dt is preferably coupled to a load of 500 ohm such that this will also give the same derived voltage dV/dt on the LIN data bus 10, in particular on the LIN pin.

The limiting signal 52 is transmitted from the limiting means 50 to a controlling means 60, namely to a counting means, for determining a delta value, for example for determining the difference between the limiting signal 52 and the systemclock signal sysclk.

For creating the processed data signal 16, in particular an enable signal, the counting means 60 is further provided with the transmitting signal TxD, and with the further time signal sysclk. Depending on the transmitting signal TxD the counting means 60 sets the processed data signal 16 up or down.

Thus, the processed data signal 14 can be determined
- by subtracting the limiting signal 52 from a value being created by means of the transmitting signal TxD and/or by means of the further time signal sysclk, or
- by adding the limiting signal 52 to a value being created by means of the transmitting signal TxD and/or by means of the further time signal sysclk.

By means of the processed data signal 16 a digital-analog converting means DAC is controlled, in particular is enabled to convert the processed digital signal 16 into an analog output signal 18.

The analog output signal 18 is transmitted to an analog low pass filter LPF1 being designed for suppressing the system clock signal sysclk and being assigned to the data bus 10 of the LIN 300.

The function of the circuit arrangement 100, in particular of the loop, is in fact to provide a voltage feedback in the digital domain but the loop corrects the dI/dt of the output current; this means that the state of the LIN signal LS is not directly influenced by the feedback.

FIG. 2A shows a schematic diagram of the data bus 10 of the L[ocal]I[nterconnected]N[etwork] 300 being used, for example, in automotive applications.

The LIN physical layer is derived from ISO 9141 standard but has some enhancements in order to adapt to the particular automotive requirements such as E[lectro]M[agnetic]C[ompatibility], E[lectro] S[tatic]D[ischange], etc.

The LIN bus 10 is part of a concept comprising a single master node 200 and multiple slave nodes 210 connected to the wire of the data bus 10. This data bus wire is connected to the battery BAT (cf. FIG. 1) by means of the external pull-up resistor R1, for example with a resistance between about 500 ohm and 1 kiloohm.

The external pull-up resistor R1 is arranged in series with a decoupling diode DD for preventing current flow from the data bus 10 to the battery BAT, with the resistor R1 and the decoupling diode DD being arranged in parallel to a capacitive unit C, for example to a condensator comprising a capacity of up to 10 nanofarad.

The battery BAT serves a positive supply voltage VBAT with respect to a reference terminal GND which serves a signal ground.

The pull-up resistor R1 keeps the wire of the data bus 10 with a recessive voltage level RSV (cf. FIGS. 2B, 2C) corresponding to a relatively high voltage near to the positive supply voltage VBAT.

The master node 200 and the slave nodes 210 comprise the circuit arrangement 100 of FIG. 1 for pulling down, during transmission of the transmitting signal TxD, the voltage of the LIN data bus 10 to a dominant voltage level DMT (cf. FIGS. 2B, 2C) which corresponds to a relatively low voltage near to ground voltage level GND in response to the data signal TxD.

In this context,

FIG. 2B depicts signals occurring in the LIN data bus 10 of
a transmitting node or driver node,
with the recessive voltage level RSV being about eighty
percent of the positive supply voltage VBAT, and
with the dominant voltage level DMT being about twenty
percent of the positive supply voltage VBAT, and FIG. 2C depicts signals occurring in the LIN data bus 10 of
a receiver node,
with the recessive voltage level RSV being about sixty
percent of the positive supply voltage VBAT, and
with the dominant voltage level DMT being about forty
percent of the positive supply voltage VBAT.

In other words, the voltage levels between the recessive voltage level RSV and the dominant voltage level DMT are more distant in the case of signals signals occurring in the LIN data bus 10 of a transmitting node or driver node (cf. FIG. 2B) than in the case of signals signals occurring in the LIN data bus 10 of a receiver node (cf. FIG. 2C).

Each node 200, 210 also comprises a built-in receiver (not shown for reasons of clarity) for processing the receiving signal RxD received from a transmitting node or from a driver node.

LIST OF REFERENCE NUMERALS 100 circuit arrangement, in particular digital L[ocal]I[nterconnected]N[etwork] transceiver, for example digital LIN control loop, such as digital LIN feedback loop
10 data bus of L[ocal]I[nterconnected]N[etwork] 300
12 input signal of circuit arrangement 100 from second analog low pass filter LPF2 to analog-digital converting means ADC
14 digital signal from analog-digital converting means ADC
16 processed digital signal, in particular enable signal, from controlling means 60 to digital-analog converting means DAC
18 output signal of circuit arrangement 100 from digital-analog converting means DAC to first analog low pass filter LPF1
20 reference means, in particular wave generator
22 reference signal from reference means 20 to comparing means 30
30 comparing means, in particular adding unit and/or multiplexing unit
32 error signal from comparing means 30 to inverting means 40
40 inverting means
42 optionally inverted error signal from inverting means 40 to limiting means 50
50 limiting means, in particular limiter or limiting unit
52 limiting signal from limiting means 50 to controlling means 60
60 controlling means, in particular counter or counting means
200 first node of L[ocal]I[nterconnected]N[etwork] 300, in particular master node
210 further node of L[ocal]I[nterconnected]N[etwork] 300, in particular slave node
300 L[ocal]I[nterconnected]N[etwork]
ADC analog-digital converting means, in particular analog-to-digital converter
BAT energy source, in particular battery, providing positive supply voltage VBAT
DAC digital-analog converting means, in particular digital-to-analog converter
DD diode, in particular decoupling diode
DMT dominant voltage level
GND reference terminal serving a signal ground or ground potential
$I_{LIN}$ current of L[ocal]I[nterconnected]N[etwork] 300, in particular current of data bus 10
LPF1 first analog low pass filter, in particular filter for suppressing further time signal sysclk
LPF2 further or second analog low pass filter, in particular anti-aliasing filter
LPF3 digital low pass filter
LS signal, in particular current signal, for example LIN signal, from data bus 10 to further or second analog low pass filter LPF2
max dI/dt maximum of current dI/dt derived from L[ocal]I[nterconnected]N[etwork] 300
min dI/dt minimum of current dI/dt derived from L[ocal]I[nterconnected]N[etwork] 300
R1 resistive unit, in particular pull-up resistor
RSV recessive voltage level
RxD receiving signal, in particular receive data output signal from digital low pass filter LPF3, for example to communication controller
sampleclk first time signal, in particular predetermined sample clock signal
sysclk further time signal, in particular predetermined system clock signal
TO transmitter output, in particular line driver output signal
TxD transmitting signal, in particular transmit data input signal, for example from communication controller to reference means 20, to inverting means 40, and to controlling means 60
VBAT positive supply voltage provided by energy source BAT

The invention claimed is:

1. A circuit arrangement for processing at least one input signal from at least one data bus of at least one LIN (Local Interconnected Network) and for providing the data bus with at least one output signal, the circuit arrangement including
at least one analog-digital converting circuit for converting the analog input signal into at least one digital signal to be processed, and
at least one digital-analog converting circuit for converting the processed digital signal into the analog output signal.

2. The circuit arrangement according to claim 1, wherein the digital signal from the analog-digital converting circuit is provided to the at least one digital low pass filter, and is arranged for creating at least one receiving signal.

3. The circuit arrangement according to claim 1, comprising
circuitry for determining the slope of the input signal, and
circuitry for controlling the output signal in dependence on the respective determined slope of the input signal.

4. A circuit arrangement for processing at least one input signal from at least one data bus of at least one LIN and for providing the data bus with at least one output signal, the circuit arrangement including
at least one analog-digital converting circuit for converting the analog input signal into at least one digital signal to be processed, and at least one digital-analog converting circuit for converting the processed digital signal into the analog output signal, wherein
at least one inverting circuit comprises at least one error signal from the comparing circuit, and
the transmitting signal (TxD), and
inverting the error signal depending on the transmitting signal (TxD), by at least one limiting circuit further comprising the optionally inverted error signal from the inverting circuit, with at least one minimum (min dI/dt) of the current (dI/dt) derived from the LAN, and at least one maximum (max dI/dt) of the current (dI/dt) derived from the LAN, and circuitry for creating at least one limiting signal, and at least one controlling circuit, in particular at least one counting circuit, comprising the transmitting signal (TxD), the limiting signal from the limiting circuit, and the further time signal (sysclk), and being designed for controlling the digital-analog converting circuit (DAC) by the processed digital signal, in particular by at least one enable signal, with the processed digital signal being for example determined by subtracting the limiting signal from at least one value being created from the transmitting signal (TxD) and/or from the further time signal (sysclk), or by adding the limiting signal to at least one value being created from the transmitting signal (TxD) and/or from the further time signal (sysclk).

5. A circuit arrangement for processing at least one input signal from at least one data bus of at least one LIN and for providing the data bus with at least one output signal, the circuit arrangement including at least one analog-digital converting circuit for converting the analog input signal into at least one digital signal to be processed, and at least one digital-analog converting circuit for converting the processed digital signal into the analog output signal, wherein the analog-digital converting circuit comprises at least one first time signal (sampleclk), for example with at least one predetermined sample clock signal, at least one reference circuit, in particular at least one wave generator, at least one transmitting signal (TxD), and at least one further time signal (sysclk), for example with at least one predetermined system clock signal, and generating at least one reference signal, and at least one comparing circuit, in particular at least one adder and/or at least one multiplexer, being provided with the digital signal, and with the reference signal, and determining at least one error of the input signal by comparing the digital signal with the reference signal, in particular by determining the deviation or difference between the digital signal and the reference signal.

6. A method for processing at least one input signal from at least one data bus of at least one LIN and for providing the data bus with at least one output signal, comprising converting the analog input signal into at least one digital signal to be processed, and converting the processed digital signal into the analog output signal.

7. The method according to claim 6, further comprising the steps of generating at least one reference signal by using at least one transmitting signal (TxD) and at least one further time signal (sysclk), determining at least one error of the input signal and creating at least one error signal by comparing the digital signal with the reference signal creating at least one limiting signal by means of the optionally inverted error signal, at least one minimum (min dI/dt) of the current (dI/dt) derived from the LIN, and at least one maximum (max dI/dt) of the current (dI/dt) derived from the LIN, and controlling the digital-analog converting means (DAC) by the processed digital signal.

* * * * *